(12) United States Patent
Yamazaki (10) Patent No.: US 7,408,610 B2
(45) Date of Patent: Aug. 5, 2008

(54) ELECTRO-OPTICAL APPARATUS AND ELECTRONIC DEVICE

(75) Inventor: Katsunori Yamazaki, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 391 days.

(21) Appl. No.: 11/262,819

(22) Filed: Nov. 1, 2005

(65) Prior Publication Data

US 2006/0114394 A1    Jun. 1, 2006

(30) Foreign Application Priority Data

Nov. 26, 2004    (JP)    ............... 2004-342757

(51) Int. Cl.
  *G02F 1/1343*    (2006.01)
  *G09G 3/36*    (2006.01)
(52) U.S. Cl. .................. 349/143; 349/139; 349/144; 345/91; 345/92
(58) Field of Classification Search ................. 349/139, 349/143, 144; 345/91, 92, 93
  See application file for complete search history.

(56) References Cited

U.S. PATENT DOCUMENTS

2004/0263744 A1* 12/2004 Lee et al. .................. 349/139
2005/0134783 A1* 6/2005 Park et al. .................. 349/141

FOREIGN PATENT DOCUMENTS

| JP | 08006067 | 1/1996 |
| JP | 2001109018 | 4/2001 |
| JP | 2002-90765 | 3/2002 |

* cited by examiner

*Primary Examiner*—Michael H Caley
(74) *Attorney, Agent, or Firm*—Lowe Hauptman Ham & Berner, LLP (57) ABSTRACT

An electro-optical apparatus includes a first and second data lines that intersect with scanning lines. A first and second pixel electrodes are positioned at opposite sides of the corresponding scanning line. A first signal electrode is formed on the electrode forming surface at a position adjacent to the first pixel electrode and is connected to the first data line. A second signal electrode is formed on the electrode forming surface at a position adjacent to the second pixel electrode and is connected to the second data line. The second signal electrode includes an interline electrode portion formed in a gap between the second pixel electrode and the first pixel electrode positioned at the second side with respect to the second pixel electrode.

9 Claims, 7 Drawing Sheets

ELECTRO-OPTICAL APPARATUS AND ELECTRONIC DEVICE

BACKGROUND

1. Technical Field

The present invention relates to a technology for driving electro-optical materials, such as liquid crystals.

2. Related Art

In an electro-optical apparatus, such as a liquid crystal device, many pixels are disposed in a matrix, and each row of pixels is selected by multiplex driving so that an image signal is supplied to each of the selected pixels. In this configuration of the electro-optical apparatus, if, in particular, the total number of pixels is increased to achieve higher precision, the duty ratio (reciprocal of the total number of scanning lines) is decreased, and the time for supplying an image signal to each pixel cannot be sufficiently ensured. To solve this problem, a so-called "multiple matrix technology" has been proposed in, for example, JP-A-2002-90765 (FIG. 10).

Figure 9:
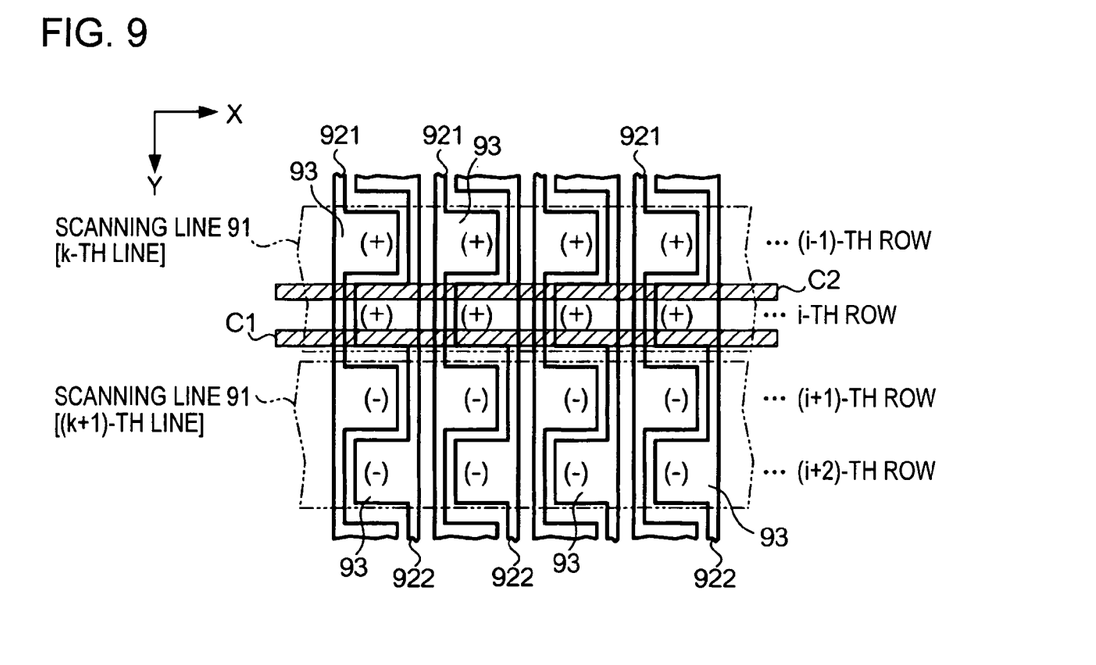
FIG. 9 is a plan view illustrating problems unique to a known electro-optical apparatus.

An electro-optical apparatus (liquid crystal device) using this multiple matrix technology includes a first substrate and a second substrate between which a liquid crystal is sealed. As shown in FIG. 9, a plurality of scanning lines 91 extending in the X direction are formed on the surface of the first substrate, a plurality of first data lines 921 and a plurality of second data lines 922 extending in the Y direction are formed on the surface of the second substrate. Many pixel electrodes 93 are disposed on the second substrate in a matrix. The pixel electrodes 93 in the odd-numbered rows are connected to the adjacent first data lines 921, and the pixel electrodes 93 in the even-numbered rows are connected to the adjacent second data lines 922. As shown in FIG. 9, two pixel electrodes 93 adjacent to each other in the Y direction oppose the same scanning line 91. Accordingly, two rows of pixels are formed for each scanning line 91. With this configuration, the duty ratio can be increased by about twice (assuming the same number of pixels) compared to that in an electro-optical apparatus in which only one pixel is formed at each intersection between a scanning line and a data line.

It is known that the application of DC components of a voltage deteriorate optical characteristics of electro-optical materials, in particular, liquid crystals. AC driving is required to suppress such deterioration in the optical characteristics. In AC driving, a positive voltage and a negative voltage relative to a predetermined voltage are alternately applied to pixels for the alternating rows. However, if this AC driving is applied to a multiple-matrix electro-optical apparatus, display irregularities occur in the shape of strips in the X direction in units of two rows of pixels corresponding to one scanning line 91. This problem is discussed in detail below.

When AC driving is applied to a multiple-matrix electro-optical apparatus, the polarity of the voltage applied to two rows of pixels corresponding to one scanning line 91 becomes opposite to that applied to two rows of pixels corresponding to the adjacent scanning line 91. That is, if, as shown in FIG. 9, a positive (+) voltage is applied to two rows of pixels corresponding to the k-th (k is a natural number) scanning line 91, a negative (−) voltage is applied to two rows of pixels corresponding to the (k+1)-th scanning line 91. The relationship of the positive and negative polarities is changed in, for example, every vertical scanning period.

Let us focus on each pixel of the i-th (i is a natural number) row to which a positive voltage is applied. Each pixel of the i-th row is adjacent to a corresponding pixel of the (i+1)-th row on the positive Y direction side and to a corresponding pixel of the (i−1)-th row at the negative Y direction side. The pixels of the (i+1)-th row are applied with a negative voltage and the pixels of the (i−1)-th row are applied with a positive voltage. Since the same polarity of the voltage (positive voltage) is applied to the pixels in the i-th row and the pixels in the (i−1)-th row, horizontal (i.e., in-plane direction in which pixels are disposed) electric fields are not generated between the pixels of the two rows. In contrast, since different polarities of voltages are applied to the pixels in the i-th row and the pixels in the (i+1)-th row, horizontal electric fields are generated between the pixels of the two rows (in particular, at interfaces between the two rows). Accordingly, liquid crystals of the pixels in the i-th row adjacent to the corresponding pixels in the (i+1)-th row are aligned in a direction different from a desired direction. As a result, the grayscale of a portion C1 shown in FIG. 9 becomes different from that of a portion C2 shown in FIG. 9 adjacent to the pixels in the (i−1)-th row. This difference in the grayscale is observed as display irregularities by users.

In an electro-optical apparatus in which only one pixel is disposed at each intersection between a scanning line and a data line, horizontal electric fields are also generated in adjacent pixels in the Y direction. In this configuration, however, display irregularities equally occur to all the pixels, and thus, this does not present any problem in the visual sense. In contrast, in a multiplex-matrix electro-optical apparatus, although horizontal electric fields are generated in a portion adjacent to the pixels in one adjacent row (i.e., pixels to which a voltage having the opposite polarity is applied), horizontal electric fields are not generated in a portion adjacent to the pixels in the other adjacent row (i.e., pixels to which a voltage having the same polarity is applied). Because of this non-uniformity, display irregularities occur.

SUMMARY

An advantage of the invention is that it provides a multiplex-matrix electro-optical apparatus in which display irregularities caused by a difference in the polarity can be suppressed.

According to an aspect of the invention, there is provided an electro-optical apparatus including substrates, a plurality of scanning lines, a first data line and a second data line, first pixel electrodes, second pixel electrodes, first signal electrodes, and second signal electrodes. The substrates oppose an electro-optical material therebetween. The plurality of scanning lines are formed on an electrode forming surface opposing the electro-optical material. The first data line and a second data line are formed on the electrode forming surface and intersect with the corresponding scanning line. Each first pixel electrode is formed at one side of a corresponding scanning line and is connected to that scanning line. Each second pixel electrode is formed at the opposite side of its corresponding scanning line and is connected to the scanning line. The first signal electrodes are formed on the electrode forming surface at a position adjacent to corresponding first pixel electrodes and are connected to the first data line. The second signal electrodes are formed on the electrode forming surface at a position adjacent to corresponding second pixel electrodes and are connected to the second data line. The second signal electrode includes an interline electrode portion formed in a gap between the second pixel electrode and the first pixel electrode positioned at the second side with respect to the second pixel electrode. A specific example of this configuration is described below in a first embodiment (FIG. 2) of the invention.

With this configuration, the electro-optical material is driven by horizontal electric fields generated between the first pixel electrode and the adjacent first signal electrode and by horizontal electric fields generated between the second pixel electrode and the adjacent second signal electrode. Because of the interline electrode portion in a gap between the second pixel electrode connected to a scanning line and the first pixel electrode connected to the adjacent scanning line, the generation of electric fields between the first pixel electrode and the second pixel electrode connected to different scanning lines can be suppressed even when voltages of opposite polarities are applied to those scanning lines. Accordingly, display irregularities caused by a difference in the polarities of the pixel electrodes can be reduced. In the invention, the signal electrode (first or second signal electrode) and the pixel electrode (first or second pixel electrode) being "adjacent to each other" means that electric fields that drive an electro-optical material are generated between the signal electrode and the pixel electrode by the application of a voltage to the signal electrode and the pixel electrode.

It is preferable that not only the second signal electrode, but also the first signal electrode include an interline electrode portion formed in a gap between the first pixel electrode and the second pixel electrode positioned at the first side with respect to the first pixel electrode. With this arrangement, the generation of electric fields between the first pixel electrode and the second pixel electrode can be suppressed more reliably compared to the configuration in which only the second signal electrode is provided with the interline electrode portion. More specifically, it is preferable that each of the first pixel electrodes and the second pixel electrodes includes a base portion and electrode portions. In this case, the base portion extends in a direction substantially parallel with the corresponding scanning line and is connected to the scanning line. The electrode portions are connected by the base portion and extend in a direction away from the scanning line. Also, each of the first signal electrodes and the second signal electrodes includes an interline electrode portion and electrode portions. The interline electrode portion extends substantially perpendicular to the corresponding first data line or the corresponding second data line and is connected to the first data line or the second data line. The electrode portions are connected to each other by the interline electrode portion and extend toward the scanning line (see FIG. 2).

The first pixel electrode and the second pixel electrode may be directly connected to the corresponding scanning line. However, it is preferable that each of the first pixel electrode and the second pixel electrode is connected to the scanning line with a two-terminal nonlinear device therebetween. By the use of a two-terminal nonlinear device (switching device), the manufacturing process can be simplified compared to the use of a three-terminal nonlinear device, such as a thin-film transistor (TFT). It is preferable that the nonlinear device includes a first metallic layer formed on the electrode forming surface, an insulating layer formed on the surface of the first metallic layer, a scanning-line-side second metallic layer formed on the surface of the insulating layer and electrically connected to the scanning line, and an electrode-side second metallic layer formed on the surface of the insulating layer and connected to the first pixel electrode or the second pixel electrode. Instead of the configuration in which each of the first pixel electrode and the second pixel electrode is connected to the scanning line with a two-terminal nonlinear device therebetween, each of the first signal electrode and the second signal electrode may be connected to the corresponding first data line or the corresponding second data line with a two-terminal nonlinear device therebetween.

Figure 6:
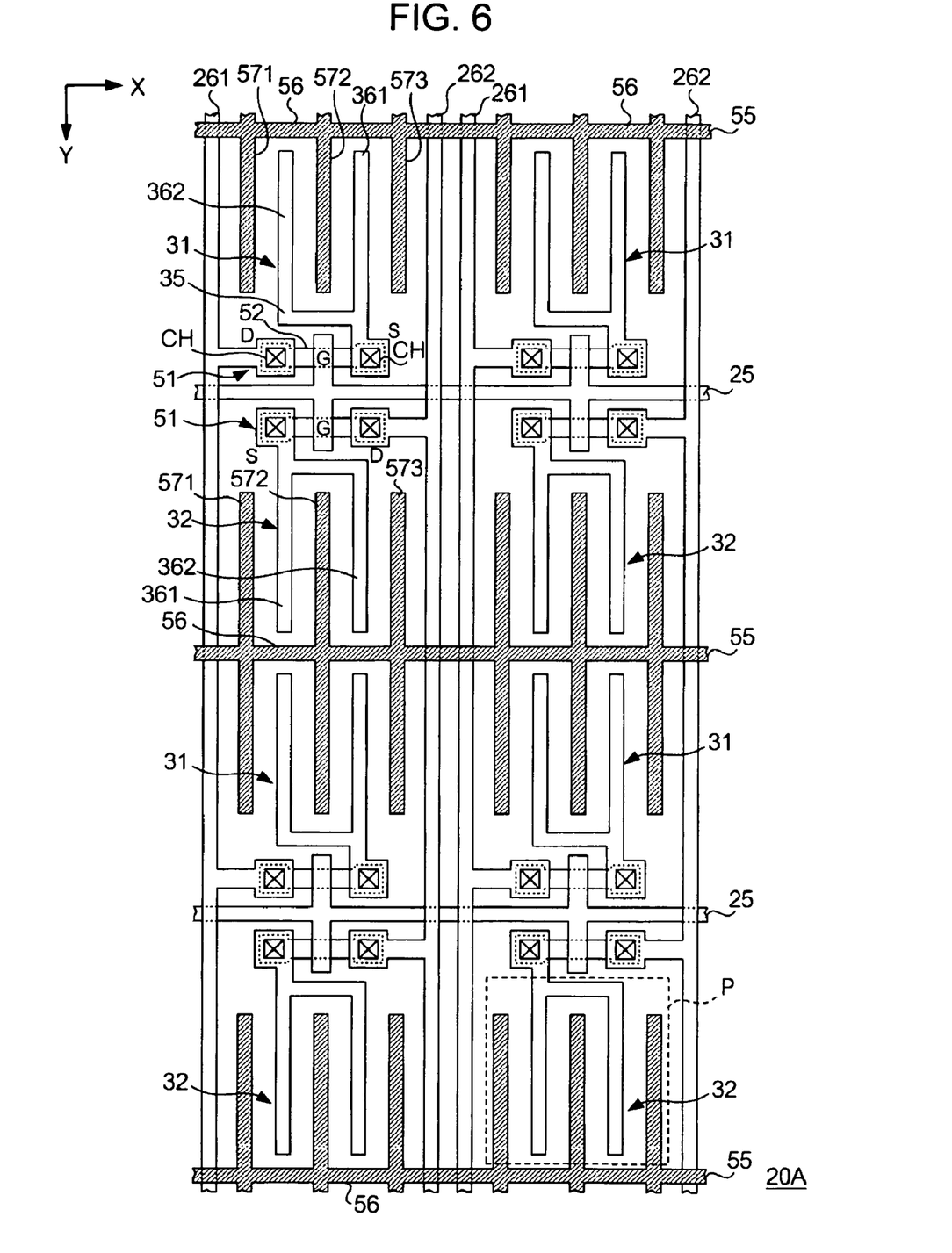
FIG. 6 is a plan view illustrating the configuration of elements disposed on the electrode forming surface in an electro-optical apparatus according to a second embodiment of the invention.

According to another aspect of the invention, there is provided an electro-optical apparatus including substrates opposing an electro-optical material therebetween, a plurality of scanning lines formed on an electrode forming surface opposing the electro-optical material, a first data line and a second data line formed on the electrode forming surface and intersecting with the corresponding scanning line, a first pixel electrode formed at a first side across the corresponding scanning line and connected to a transistor disposed at an intersection between the first data line and the scanning line, a second pixel electrode formed at a second side across the corresponding scanning line and connected to a transistor disposed at an intersection between the second data line and the scanning line, and a common electrode formed on the electrode forming surface at a position adjacent to the first pixel electrode and the second pixel electrode, the common electrode including an interline electrode portion formed in a gap between the first pixel electrode and the second pixel electrode positioned at the first side with respect to the first pixel electrode and an interline electrode portion formed in a gap between the second pixel electrode and the first pixel electrode positioned at the second side with respect to the second pixel electrode. A specific example of this configuration is described below in a second embodiment of the invention (FIG. 6).

With this configuration, when a voltage is applied to a scanning line to turn ON the corresponding transistors (for example, TFTs), a voltage of the first data line is applied to the first pixel electrode, and a voltage of the second data line is applied to the second pixel electrode. In this state, the electro-optical material is driven by horizontal electric fields generated between the first pixel electrode and the adjacent common electrode and by horizontal electric fields generated between the second pixel electrode and the adjacent common electrode. Because of the interline electrode portion of the common electrode in a gap between the second pixel electrode connected to a certain scanning line and the first pixel electrode connected to the adjacent scanning line, the generation of electric fields between the second pixel electrode and the first pixel electrode can be suppressed even when voltages of opposite polarities are applied to the second pixel electrode and the first pixel electrode. Accordingly, as in the electro-optical apparatus according to the previous aspect of the invention, display irregularities caused by a difference in the polarities of the voltages applied to the pixels can be reduced.

The electro-optical apparatuses according to the above-described aspects of the invention are typically used as display units for various electronic devices. Such electronic devices include, for example, personal computers, cellular telephones, and projection display devices.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
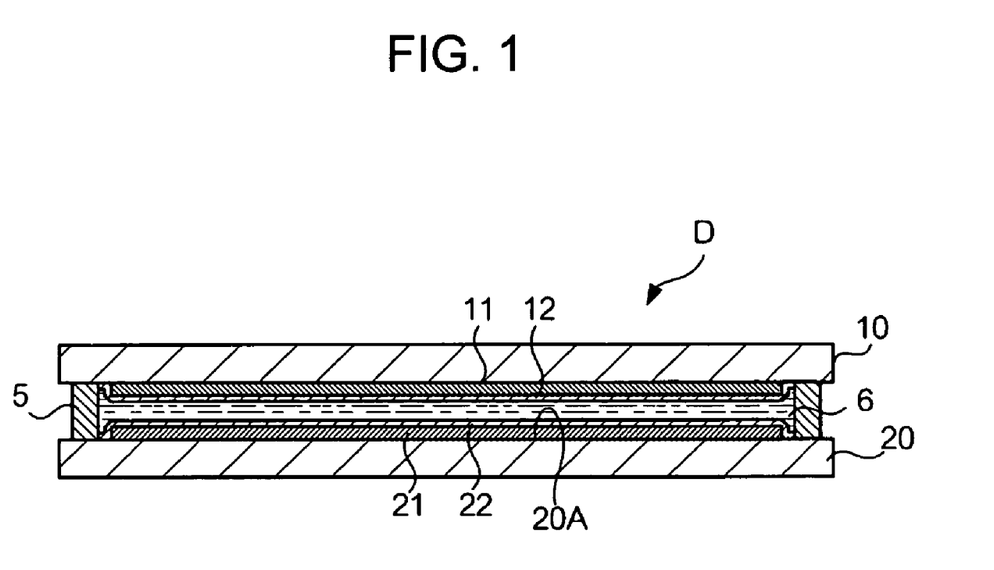
FIG. 1 is a sectional view illustrating the configuration of an electro-optical apparatus according to a first embodiment of the invention.

In a first embodiment of the invention, an electro-optical apparatus using a liquid crystal as an electro-optical material is described below. An electro-optical apparatus D shown in FIG. 1 is a multiple-matrix display device using a so-called in-plane switching (IPS) method, and includes a first substrate 10 and a second substrate 20 sealed with each other with a sealing member 5 therebetween such that they face each other. A liquid crystal 6 is sealed in a space formed by the first substrate 10, the second substrate 20, and the sealing member 5. Polarizers and retardation film are attached to each of the first and second substrates 10 and 20 on the surfaces opposite to the surfaces facing the liquid crystal 6, though they are not shown in FIG. 1.

A coloring layer 11 is formed on the surface of the first substrate 10 facing the liquid crystal 6. The coloring layer 11 includes a color filter which is colored corresponding to a color assigned to each pixel and a light-shielding layer for shielding a gap of each pixel. The surface of the coloring layer 11 is covered with an alignment layer 12 that is subjected to a rubbing treatment for defining the initial alignment direction of the liquid crystal 6. On a surface 20A (hereinafter referred to as an "electrode forming surface") of the second substrate 20 facing the liquid crystal 6, elements 21, such as electrodes and wiring for driving the liquid crystal 6, are formed. The elements 21 are also covered with an alignment layer 22 subjected to a rubbing treatment, as in the alignment layer 12.

Figure 2:
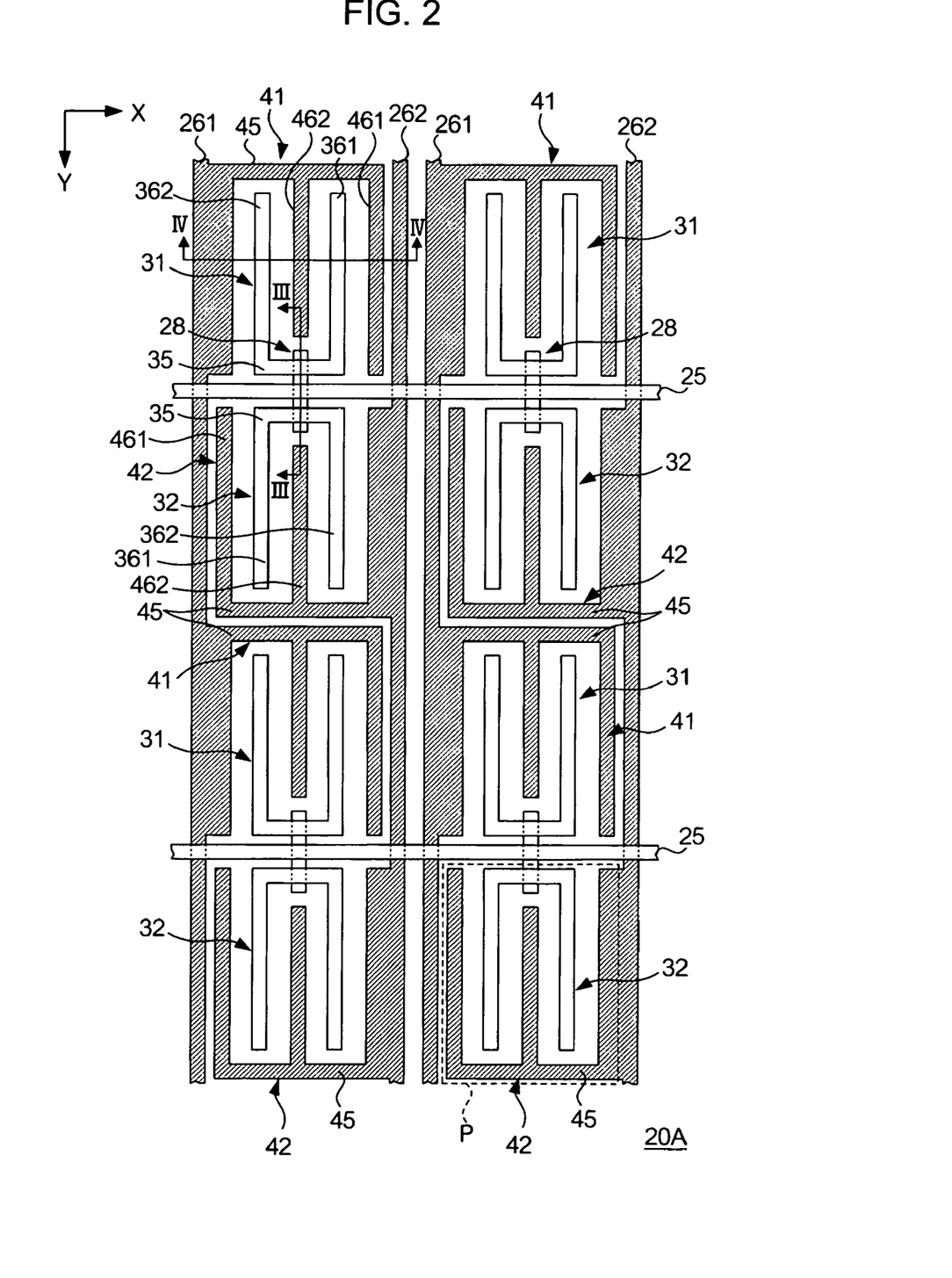
FIG. 2 is a plan view illustrating the configuration of elements disposed on the electrode forming surface.

FIG. 2 is a plan view illustrating the configuration of the elements 21 formed on the electrode forming surface 20A of the second substrate 20 when viewed from the first substrate 10. A plurality of scanning lines 25 extending in the X direction are formed, as shown in FIG. 2, on the electrode forming surface 20A. First pixel electrodes 31 are formed at the negative Y direction side (upward in FIG. 2) of each scanning line 25, while second pixel electrodes 32 are formed at the positive Y direction side (downward in FIG. 2) of each scanning line 25. The first and second pixel electrodes 31 and 32 are disposed in a matrix on the electrode forming surface 20A. Each of the first and second pixel electrodes 31 and 32 includes a base portion 35 extending in the X direction at a position adjacent to the scanning line 25 and two electrode portions 36 (361 and 362) interconnected to both ends of the base portion 35 and extending in the direction away from the scanning line 25.

Figure 3:
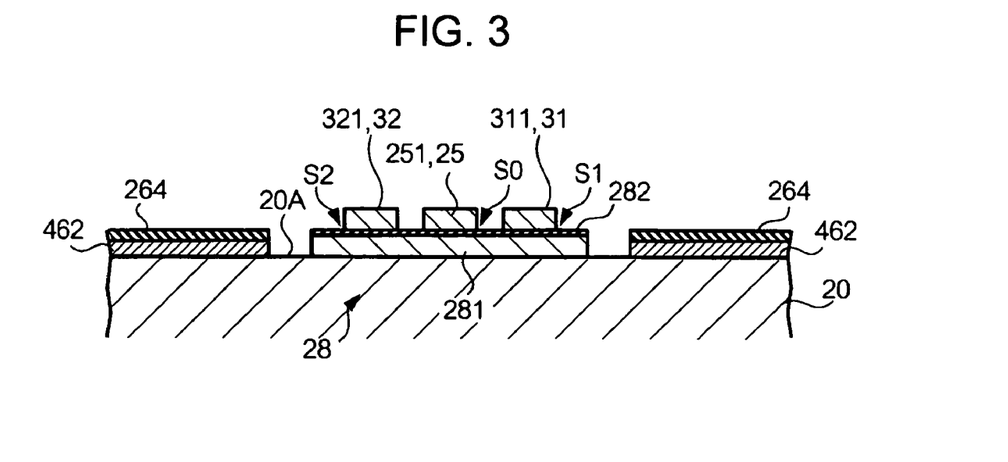
FIG. 3 is a sectional view taken along line III-III of FIG. 2.

The first pixel electrode 31 and the second pixel electrode 32 adjacent to each other across one scanning line 25 are connected to that scanning line 25 with a nonlinear device 28 therebetween. FIG. 3 is a sectional view taken along line III-III of FIG. 2. The nonlinear device 28 includes, as shown in FIG. 3, a first metallic layer 281 formed on the electrode forming surface 20A, an insulating layer 282 formed on the surface of the first metallic layer 281, a scanning-line-side second metallic layer 251 (at the side of the scanning line 25) formed on the surface of the insulating layer 282, and electrode-side second metallic layers 311 and 321 (at the side of the electrodes 31 and 32) formed on the surface of the insulating layer 282. The first metallic layer 281 is a film formed of a conductive material, such as tantalum (Ta), and extends in the Y direction, as shown in FIG. 2, to intersect with the scanning line 25. The insulating layer 282 is formed by anodizing the first metallic layer 281. The scanning-line-side second metallic layer 251 and the electrode-side second metallic layers 311 and 321 are formed of a conductive material, such as chromium (Cr). The scanning line 25 extends, as shown in FIGS. 2 and 3, in the X direction while passing over the surface of the insulating layer 282 covering the first metallic layer 281. The portion of the scanning line 25 opposing the first metallic layer 281 across the insulating layer 282 corresponds to the scanning-line-side second metallic layer 251. Similarly, the base portions 35 of the first and second pixel electrodes 31 and 32 extend in the X direction while passing over the surface of the insulating layer 282. The part of the base portion 35 of the first pixel electrode 31 opposing the first metallic layer 281 across the insulating layer 282 corresponds to the electrode-side second metallic layer 311, and the part of the base portion 35 of the second pixel electrode 32 opposing the first metallic layer 281 across the insulating layer 282 corresponds to the electrode-side second metallic layer 321.

Each nonlinear device 28 electrically includes three nonlinear resistor elements S (S0, S1, and S2). The central resistor element (hereinafter referred to as the "common element") S0 is a nonlinear resistor element (thin film diode (TFD) element) formed by laminating the scanning-line-side second metallic layer 251, the insulating layer 282, and the first metallic layer 281 in that order when viewed from the scanning line 25. The first element S1 positioned at the side of the first pixel electrode 31 when viewed from the common element S0 is a nonlinear resistor element formed by laminating the first metallic layer 281, the insulating layer 282, and the electrode-side second metallic layer 311 in that order from the second substrate 20. Similarly, the second element S2 positioned at the side of the second pixel electrode 32 when viewed from the common element S0 is a nonlinear resistor element formed by laminating the first metallic layer 281, the insulating layer 282, and the electrode-side second metallic layer 321 in that order from the second substrate 20. Those elements have a sandwich structure of a metal/insulating-member/metal, thereby exhibiting a positive-and-negative-bidirectional diode-switching characteristic. The common element S0 and the first element S1 are connected in series with each other so as to face in opposite directions (that is, in terms of there diode function) and are interposed in the path from the scanning line 25 to the first pixel electrode 31. The common element S0 and the second element S2 are connected in series with each other so as to face in opposite directions (that is, in terms of there diode function) and are interposed in the path from the scanning line 25 to the second pixel electrode 32. With this configuration, a current-voltage nonlinear characteristic in the positive direction can be symmetrical with that in the negative direction compared to the configuration in which each of the first and second pixel electrodes 31 and 32 is connected to the scanning line 25 with one nonlinear resistor element therebetween.

On the electrode forming surface 20A, as shown in FIG. 2, a pair of first data line 261 and second data line 262 extending in the Y direction are formed for each column of the first and second pixel electrodes 31 and 32 extending in the Y direction (hereinafter referred to as a "pixel electrode column"). In FIG. 2, the first data lines 261 and the second data lines 262 (and first signal electrodes 41 and second signal electrodes 42, which are discussed below) are hatched for the sake of convenience.

Figure 4:
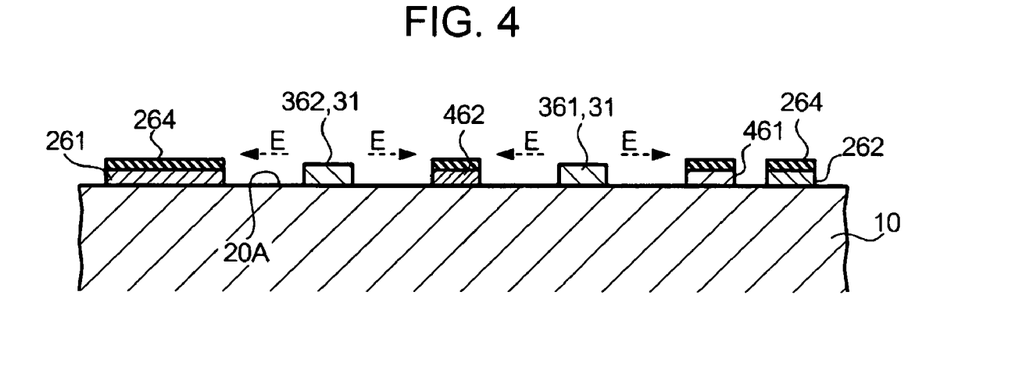
FIG. 4 is a sectional view taken along line IV-IV of FIG. 2.

Each first data line 261 is adjacent to the corresponding pixel electrode column in the negative X direction, and each second data line 262 is adjacent to the corresponding pixel electrode column in the positive X direction. That is, one pixel electrode column is sandwiched between a pair of first and second data lines 261 and 262. FIG. 4 is a sectional view taken along line IV-IV of FIG. 2. The first and second data lines 261 and 262 are formed of the same conductive material (for example, tantalum) as that of the first metallic layer 281 of the nonlinear device 28, and an insulating layer 264 is formed on the surface of the first and second data lines 261 and 262. Although each of the first and second data lines 261 and 262 intersect with the scanning lines 25, as shown in FIG. 2, the scanning lines 25 are electrically insulated from the first and second data lines 261 and 262 by the provision of the insulating layer 264.

As shown in FIG. 2, a plurality of first signal electrodes 41 are connected to the corresponding ones of the first data lines 261, and a plurality of second signal electrodes 42 are connected to the corresponding ones of the second data lines 262. In this embodiment, the portions branched from the first data lines 261 and the second data lines 262 are the first signal electrodes 41 and the second signal electrodes 42, respectively. The first signal electrodes 41 are disposed adjacent to the first pixel electrodes 31, while the second signal electrodes 42 are disposed adjacent to the second pixel electrodes 32. Accordingly, the first signal electrodes 41 and the second signal electrodes 42 are alternately disposed in the Y direction. Each of the first and second signal electrodes 41 and 42 includes an interline electrode portion 45 and electrode portions 46 (461 and 462). The more specific configuration of the first and second signal electrodes 41 and 42 is as follows.

The interline electrode portion 45 of the first signal electrode 41 extends in the positive X direction from the first data line 261, at a position on the opposite side (in the negative Y direction) of the first pixel electrode 31 than the scanning line 25. In other words, the interline electrode portion 45 of each first signal electrode 41 extends in the X direction within a gap between 1) the first pixel electrode 31 that is adjacent to that first signal electrode 41 and 2) the second pixel electrode 32 that is positioned in the negative Y direction from the first pixel electrode 31. The electrode portions 46 of the first signal electrode 41 are interconnected by the interline electrode portion 45. As shown in FIG. 2, the electrode portion 461 extends in the Y direction in a gap between the electrode portion 361 of the first pixel electrode 31 and the second data line 262. As shown in FIG. 2, the electrode portion 462 extends in the Y direction in a gap between the electrode portion 361 and the electrode portion 362 of the first pixel electrode 31.

On the other hand, the interline electrode portion 45 of the second signal electrode 42 extends in the negative X direction from the second data line 262 and is located at the opposite side of the second pixel electrode 32 (in the positive Y direction) than the scanning line 25. In other words, the interline electrode portion 45 of the second signal electrode 42 extends in the X direction in a gap between 1) the second pixel electrode 32 adjacent to that second signal electrode 42 and 2) the first pixel electrode 31 that is in the positive Y direction from the second pixel electrode 32. As shown in FIG. 2, the electrode portion 461 of the second signal electrode 42 extends in the Y direction in a gap between the first data line 261 and the electrode portion 361 of the second pixel electrode 32. As shown in FIG. 2, the electrode portion 462 extends in the Y direction in a gap between the electrode portion 361 and the electrode portion 362 of the second pixel electrode 32.

With this configuration, when voltage is applied to the first pixel electrode 31 and the adjacent first signal electrode 41, then electric fields E are generated between these electrodes. As shown in FIG. 4, the electric fields E are parallel with the electrode forming surface 20A and are referred to as horizontal electric fields. The electric fields E change the alignment direction of the liquid crystal 6. Electric fields E are generated in a similar manner when a voltage is applied between the second pixel electrode 32 and the adjacent second signal electrode 42. As indicated by the broken lines in FIG. 2, the region in which a second pixel electrode 32 and a second signal electrode 42 are adjacent to each other serves as a pixel P. The region in which a first pixel electrode 31 and a first signal electrode 41 are adjacent to each other also serves as a pixel P. Details of the driving operation of each pixel P are discussed below with reference to FIG. 5.

A scanning signal is supplied to each scanning line 25 from a scanning-line drive circuit (not shown). A scanning signal supplied to the k-th scanning line 25 serves as a selection voltage in the k-th horizontal scanning period in each vertical scanning period, and serves as a non-selection voltage in the other periods. The selection voltage is a voltage that turns ON the nonlinear device 28 regardless of the voltage applied to the first and second data lines 261 and 262, and the non-selection voltage is a voltage that turns OFF the nonlinear device 28 regardless of the voltage applied to the first and second data lines 261 and 262. The polarity of the selection voltage of the scanning signal supplied to one scanning line 25 is opposite to that supplied to the adjacent scanning line 25. If, for example, the scanning signal supplied to the k-th scanning line 25 in a horizontal scanning period is a positive selection voltage, the scanning signal supplied to the (k+1)-th scanning line 25 in the subsequent horizontal scanning period becomes a negative selection signal. The polarity of the selection voltage supplied to one scanning line 25 in a vertical scanning period is opposite to that supplied to the same scanning line 25 in the subsequent vertical scanning period. During a horizontal scanning period, one scanning line 25 is selected, that is, the scanning signal supplied to the scanning line 25 becomes a selection voltage. At this time, data signals are supplied from a data-line drive circuit (not shown) to the first and second data lines 261 and 262. The data signal for each data line (261 and 262) is based on the grayscale of the pixel P disposed at the intersection between the data line and the selected scanning line 25. For example, the data signal could have a time density during the horizontal scanning period that is based on the grayscale of the pixel P. Accordingly, a voltage corresponding to the difference between a selection voltage and a data signal voltage is applied between the first pixel electrode 31 and the first signal electrode 41 or between the second pixel electrode 32 and the second signal electrode 42, and the alignment direction of the liquid crystal 6 is controlled for each pixel P according to this difference voltage.

Figure 5:
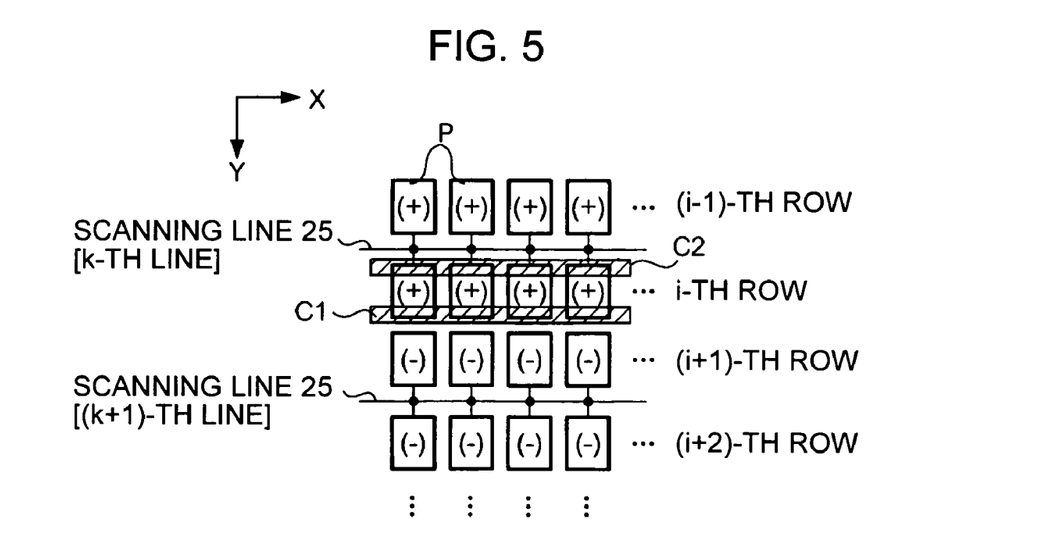
FIG. 5 illustrates the polarities of voltages applied to pixels.

As a result of performing the above-described driving operation, as shown in FIG. 5, the polarity of the voltage applied to the liquid crystal 6 of the pixels P for two rows corresponding to one scanning line 25 becomes opposite to that applied to the liquid crystal 6 of the pixels P for two rows corresponding to the subsequent scanning line 25. That is, if a voltage of a positive polarity (+) is applied to the pixels P for the two rows connected to the k-th scanning line 25, a voltage of a negative polarity (−) is applied to the pixels P for two rows connected to the (k+1)-th scanning line 25. Accordingly, the pixels P of the i-th row are adjacent to the negative Y direction side of the corresponding pixels P of the (i+1)-th row, which are applied with a negative voltage. The pixels P of the i-th row include the second signal electrode 42 and the second pixel electrode 32, which is connected to the k-th scanning line 25. In this embodiment, due to the presence of the interline electrode portion 45 of the second signal electrode 42 interposed in a gap between the pixels P of the i-th row and the pixels P of the (i+1)-th row, electric fields generated between the pixels P of the i-th row and the pixels P of the (i+1)-th row are blocked by the interline electrode portion 45 although voltages of opposite polarities are applied to the pixels P adjacent to each other in the Y direction. Thus, the grayscale at portion C1 of the pixels P in the i-th row adjacent to the pixels P in the (i+1)-th row will better proximate that at portion C2 of the pixels P in the i-th row adjacent to the pixels P in the (i−1)-th row to which the same polarity of the voltage is applied. That is, according to this embodiment, display irregularities caused by a difference in the polarities of the voltages applied to the pixels P can be suppressed.

Second Embodiment

The configuration of an electro-optical apparatus according to a second embodiment of the invention is described below.

In the first embodiment, to control the voltage applied to the liquid crystal 6, a two-terminal nonlinear device is used. In the second embodiment, a transistor, which is a three-terminal nonlinear device, is used instead of the two-terminal nonlinear device. In this embodiment, components similar to those of the first embodiment are designated with like reference numerals, and an explanation thereof is thus omitted.

FIG. 6 is a plan view illustrating the configuration of the elements 21 disposed on the electrode forming surface 20A of the second substrate 20 of the electro-optical apparatus D of this embodiment. As in the first embodiment, on the electrode forming surface 20A of the second substrate 20, as shown in FIG. 6, the plurality of scanning lines 25, the first and second pixel electrodes 31 and 32 adjacent to each other in the Y direction across the corresponding scanning lines 25, and the first and second data lines 261 and 262 extending in the Y direction to sandwich the first and second pixel electrodes 31 and 32 in the X direction are formed. A thin-film transistor (hereinafter referred to as a "TFT device") 51 at the negative Y direction side of the scanning line 25 is interposed between the first pixel electrode 31 and the first data line 261. Similarly, a TFT device 51 at the positive Y direction side of the scanning line 25 is interposed between the second pixel electrode 32 and the second data line 262. Each TFT device 51 includes a semiconductor layer 52 formed with a drain region (D) and a source region (S) on either side of a channel region (G). The portions branched in both the positive and negative Y directions from each scanning line 25 serve as gate electrodes, each opposing the channel region (G) via a gate insulating layer (not shown) covering the semiconductor layer 52. Each of the first and second pixel electrodes 31 and 32 is electrically connected to the source region (S) of the semiconductor layer 52 via a contact hole CH formed through an interlayer insulating layer (not shown) and the gate insulating layer covering the semiconductor layer 52 and the scanning line 25. Each of the first and second data lines 261 and 262 is electrically connected to the drain region (D) of the semiconductor layer 52 via a contact hole CH formed through the interlayer insulating layer and the gate insulating layer.

On the electrode forming surface 20A, a plurality of common electrodes 55 extending in the X direction are formed between the scanning lines 25. In FIG. 6, the common electrodes 55 are hatched for the sake of convenience. Each common electrode 55 includes an interline electrode portion 56 and a plurality of electrode portions 57 (571, 572, and 573). The interline electrode portion 56 extends in the X direction in a gap between the first pixel electrode 31 connected to a certain scanning line 25 and the second pixel electrode 32 connected to the adjacent scanning line 25. That is, the interline electrode portion 56 is interposed at an interval of the pixels P for two rows connected to the same scanning line 25. The electrode portions 57 are extended in the Y direction from the interline electrode portion 56 toward the first and second pixel electrodes 31 and 32. More specifically, the electrode portion 571 is formed in a gap between the first data line 261 and the first pixel electrode 31 or the second pixel electrode 32, the electrode portion 572 is formed in a gap between the electrode portions 361 and 362 of the first pixel electrode 31 or the second pixel electrode 32, and the electrode portion 573 is formed in a gap between the first pixel electrode 31 or the second pixel electrode 32 and the second data line 262. Substantially the same potential (common potential) is supplied to all the common electrodes 55. The common potential is, for example, the center potential of the voltage amplitude of a data signal.

According to the above-described configuration, when a selection voltage (which turns ON the TFT devices 51) is applied to one of the scanning lines 25 by the scanning-line drive circuit, the TFT devices 51 for two rows connected to the scanning line 25 are turned ON. Then, a data signal supplied to the first data line 261 is supplied to the first pixel electrode 31 via the TFT devices 51, while a data signal supplied to the second data line 262 is supplied to the second pixel electrode 32. The data signal in this embodiment is a voltage signal that specifies the grayscale of each pixel P, and is generated in the data-line drive circuit so that the polarity of the voltage signal relative to a predetermined voltage is inverted in each horizontal scanning period. As a result of the above-described driving operation, the voltage is applied to the first pixel electrode 31 and the adjacent common electrode 55 and to the second pixel electrode 32 and the adjacent common electrode 55. Accordingly, as in the first embodiment, horizontal electric fields E in parallel with the electrode forming surface 20A are generated so that the alignment direction of the liquid crystal 6 is changed. That is, as indicated by the broken lines in FIG. 6, the region in which the first pixel electrode 31 (or the second pixel electrode 32) and the common electrode 55 are adjacent to each other serves as the pixel P.

As in the first embodiment, in the second embodiment, the polarity of a voltage applied to the pixels P for two rows corresponding to one scanning line 25 is opposite to that applied to the pixels P for two rows corresponding to the adjacent scanning line 25. However, because of the interline electrode portion 56 of the common electrode 55 interposed in a gap between the first pixel electrode 31 connected to the scanning line 25 and the second pixel electrode 32 connected to the adjacent scanning line 25, electric fields generated between the pixels P can be suppressed. Accordingly, advantages similar to those of the first embodiment can also be achieved.

Modifications

Various modifications can be made to the above-described embodiments. Specific modified examples are as follows. The following modified examples can be combined in a suitable manner.

(1) Although in the first embodiment the interline electrode portion 45 is provided for each of the first signal electrode 41 and the second signal electrode 42, it may be provided for only one of the first and second signal electrodes 41 and 42. In this configuration, in a gap between the first pixel electrode 31 connected to a scanning line 25 and the second pixel electrode 32 connected to the adjacent scanning line 25, the interline electrode portion 45 provided for one of the first and second signal electrodes 41 and 42 is interposed. Thus, advantages similar to those of the first embodiment can be achieved.

(2) In the first and second embodiments, an active-matrix electro-optical apparatus provided with nonlinear devices has been described. However, a passive-matrix electro-optical apparatus without nonlinear devices may be used in the invention. For example, in the configuration of the first embodiment shown in FIG. 2, the first pixel electrode 31 and the second pixel electrode 32 may be directly connected to the scanning line 25 (i.e., without the intervening nonlinear device 28). In the first embodiment, the nonlinear device 28 is interposed between the scanning line 25 and the first pixel electrode 31 or the second pixel electrode 32. Alternatively, the nonlinear device 28 may be interposed between the first data line 261 and the first signal electrode 41 and between the second data line 262 and the second signal electrode 42.

(3) Although in the first and second embodiments pixels P for two rows are disposed for each scanning line 25, the number of rows of pixels P connected to the same scanning line 25 may be more than two, for example, pixels P for four rows may be disposed for each scanning line 25. In this configuration, four data lines associated with the pixels P are formed for each pixel electrode column.

Figure 7:
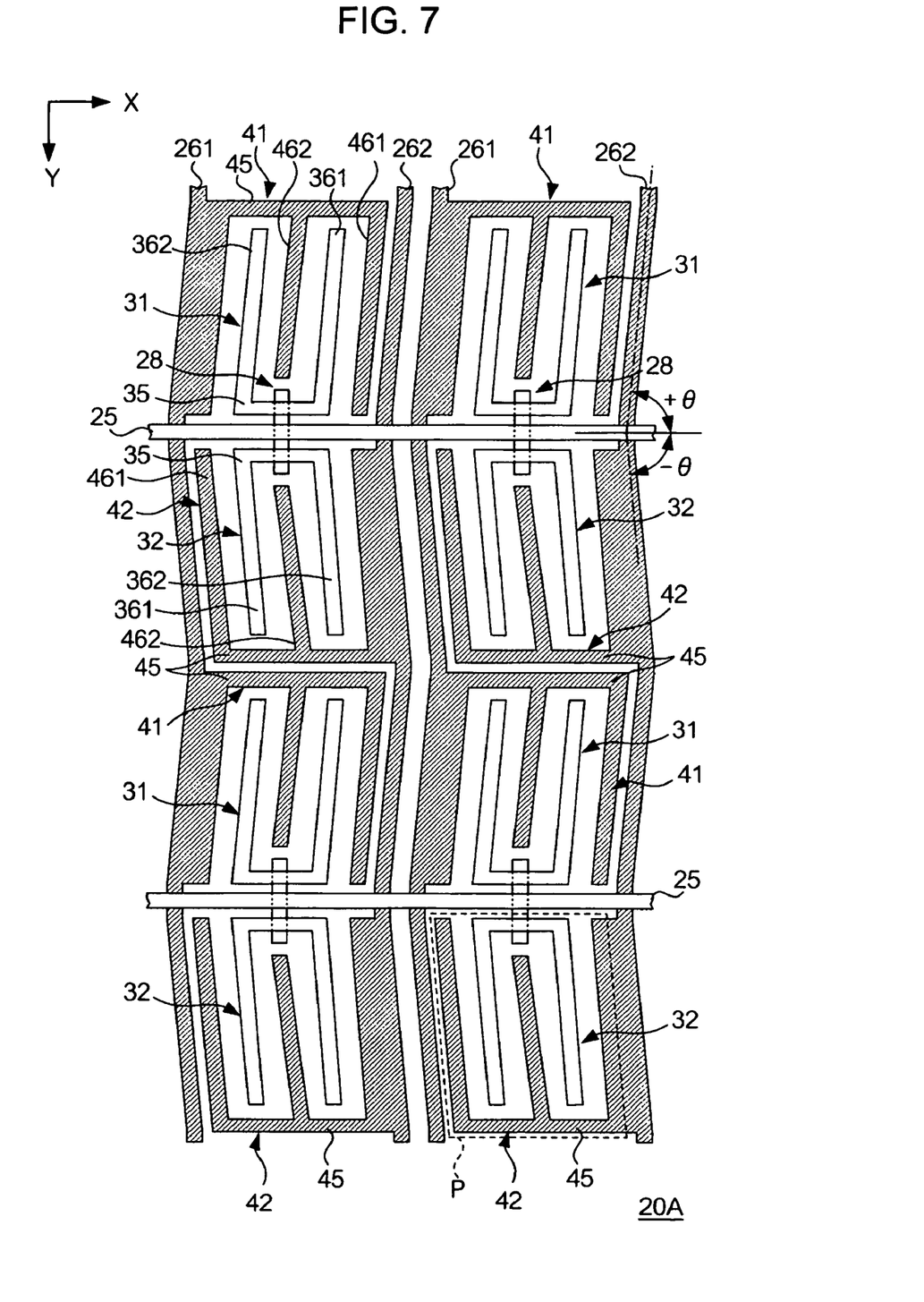
FIG. 7 is a plan view illustrating the configuration of elements disposed on the electrode forming surface in a modified example.

(4) By differentiating the shapes of the pixels P, the angle-dependent visibility can be compensated for. For example, in the first embodiment, the configuration shown in FIG. 7 may be employed. In FIG. 7, the pixels P positioned on the negative Y direction side of the scanning line 25 and the pixels P positioned at the positive Y direction side of the scanning line 25 are tilted in the opposite directions with respect to the X direction. More specifically, the electrode portions 361 and 362 of the first pixel electrode 31, the electrode portions 461 and 462 of the first signal electrode 41, the portion of the first data line 261 adjacent to the first pixel electrode 31, and the portion of the second data line 262 adjacent to the first signal electrode 41 are tilted at an angle of $+\theta$ (satisfying $0°<\theta<90°$ or $90°<\theta<180°$) with respect to the X direction. The electrode portions 361 and 362 of the second pixel electrode 32, the electrode portions 461 and 462 of the second signal electrode 42, the portion of the first data line 261 adjacent to the second signal electrode 42, and the portion of the second data line 262 adjacent to the second pixel electrode 32 are tilted at an angle of $-\theta$ with respect to the X direction. With this configuration, the image characteristic perceived by an observer can be as good whether viewing the electro-optical apparatus D obliquely from above (from the proximal side in the plane of the drawing) or obliquely from below. Although the configuration shown in FIG. 7 is based on the configuration of the first embodiment, such a modification may be similarly applied to the second embodiment.

(5) In the first and second embodiments, an electro-optical apparatus using the liquid crystal 6 as the electro-optical material has been discussed. However, the invention can be applied to an apparatus using another type of electro-optical material, for example, to a display device using an organic light emitting diode (OLED), such as an organic electroluminescent (EL) material or a light emitting polymer, as the electro-optical material, an electrophoretic display device using a microcapsule containing a colored liquid and white particles dispersed in the liquid as the electro-optical material, a twist ball display using a twist ball that is colored in different colors depending on the regions of different polarities as the electro-optical material, a toner display using a black toner as the electro-optical material, or a plasma display panel using a high-pressure gas, such as helium or neon, as the electro-optical material.

Figure 8:
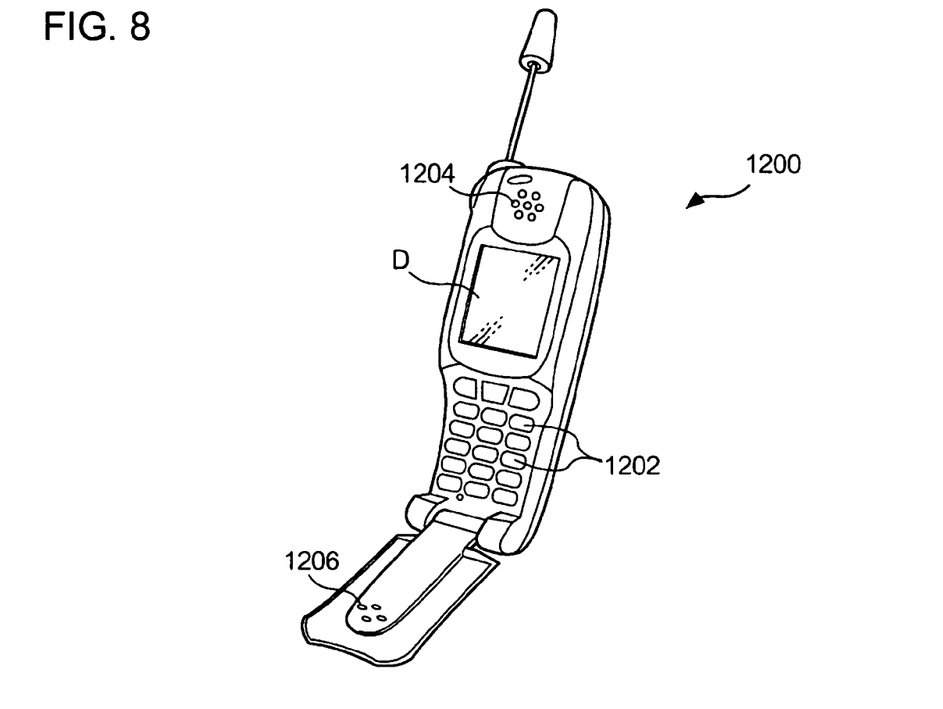
FIG. 8 is a perspective view illustrating the configuration of a cellular telephone using the electro-optical apparatus according to an embodiment of the invention.

An electronic device using the electro-optical apparatus according to an embodiment of the invention as a display device is described below. FIG. 8 is a perspective view illustrating the configuration of a cellular telephone 1200 including the electro-optical apparatus according to the first or second embodiment. The cellular telephone 1200 includes, as shown in FIG. 8, a plurality of operation buttons 1202 operated by a user, an earpiece 1204 for outputting sound received from another terminal device, a mouthpiece 1206 for inputting sound to be transmitted to another terminal device, and the electro-optical apparatus D that displays various images.

Electronic devices using the electro-optical apparatus according to an embodiment of the invention include, not only the cellular telephone 1200 shown in FIG. 8, but also notebook-type personal computers, liquid crystal televisions, viewfinder-type (or direct-view-type) video recorders, digital cameras, car navigation systems, pagers, digital diaries, calculators, word processors, workstations, videophones, point-of-sales (POS) terminals, devices provided with touch panels, etc. In any type of electronic device, the high-quality display operation while suppressing horizontal crosstalk can be implemented with a simple configuration.

Figure 10A:
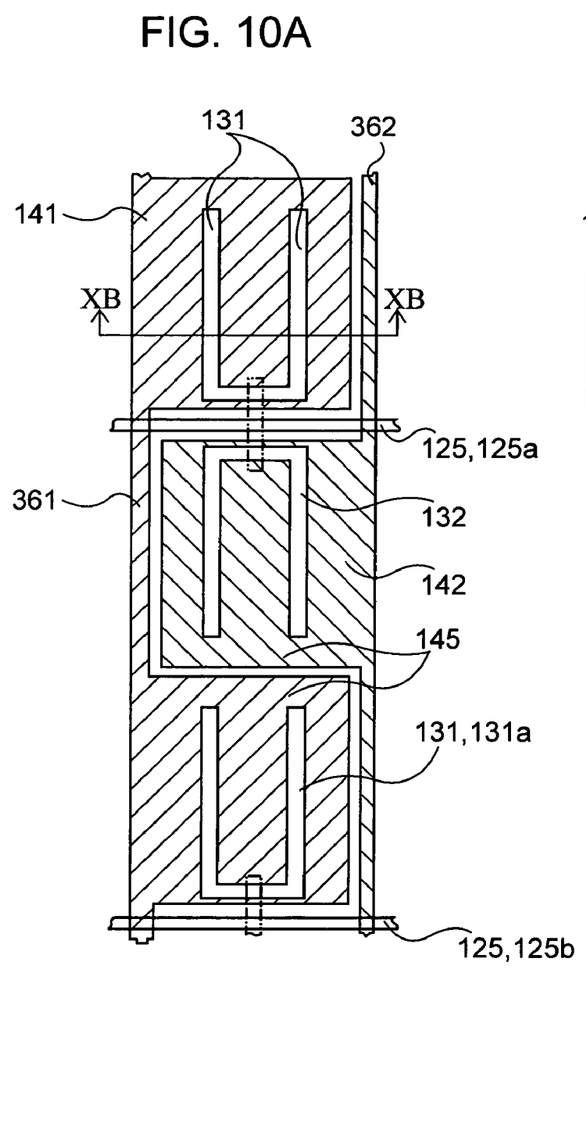
FIG. 10A is a plan view showing an embodiment of the present invention applied to an field fringe switching display.
Figure 10B:
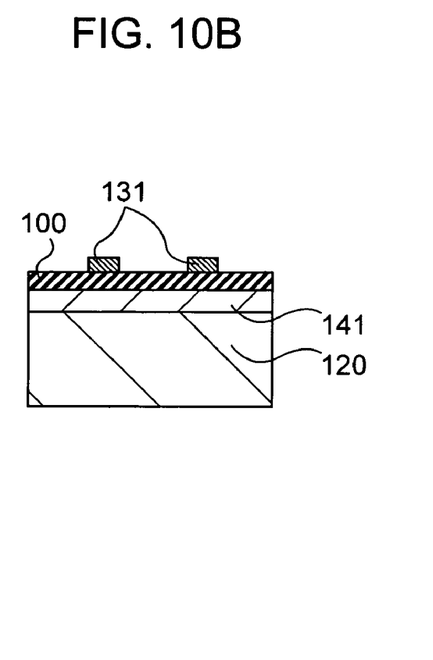
FIG. 10B is a cross-sectional view taken along line XB-XB of FIG. 10A.

Although the above embodiments describe the present invention as applied to an in-plane switching (IPS) configuration, the present invention may also be applied to a fringe-field switching (FFS) configuration. As shown in FIGS. 10A and 10B, an FFS display according to one embodiment of the present invention includes, disposed between a substrate 120 and liquid crystal layer (not shown), a plurality of scanning lines 125, a first data line 361, a second data line 362, first pixel electrodes 131, second pixel electrodes 132, an insulation layer 100, a first signal electrode 141, and a second signal electrode 142.

The first data line 361 and the second data line 362 intersect with the scanning lines 125. The first pixel electrodes 131 are provided in correspondence with the scanning lines 125. Each of the first pixel electrode 131 is connected to the corresponding scanning line 125 and is disposed to one side of the corresponding scanning line 125, that is, above as viewed in FIG. 10A. The second pixel electrodes 132 are also provided in correspondence with the scanning lines 125. Each second pixel electrode 132 is connected to the corresponding scanning line and is disposed on the other side of the corresponding scanning line 125 than the corresponding first pixel electrode 131, that is, below as viewed in FIG. 10A.

As shown in FIG. 10B, the signal electrodes 141 (and 142) are separated from the pixel electrodes 131 (132) by the insulation layer 100. The first signal electrode 141 is disposed at a position adjacent to a first pixel electrode 131 and connected to the first data line 361. The second signal electrode 142 is disposed at a position adjacent to the second pixel electrode 132 and is connected to the second data line 362. The second signal electrode 142 includes an interline electrode portion 145 located in between a second pixel electrode 132 connected to one scan line 125a and a first pixel electrode 131a connected to a different scan line 125b adjacent to the one scan line 125a.

Note that the functions of the pixel electrodes 131, 132 and the signal electrodes 141, 142 can be reversed. That is to say, the electrodes 131, 132 positioned between the liquid crystal and the insulation layer 100 can serve as signal electrodes and the electrodes 141, 142 positioned between the insulation layer 100 and the substrate 120 can serves a pixel electrodes.

The entire disclosure of Japanese Patent Application No. 2004-342757, filed on Nov. 26, 2004, is expressly incorporated by reference herein.

What is claimed is:

1. An electro-optical apparatus comprising:
a first substrate;
a second substrate opposing the first substrate;
an electro-optical material disposed between the first substrate and the second substrate;
a plurality of scanning lines disposed in between the first substrate and the electro-optical material;
a first data line and a second data line disposed in between the first substrate and the electro-optical material and intersecting with the scanning lines;
first pixel electrodes provided in correspondence with the scanning lines, each first pixel electrode being connected to the corresponding scanning line and being disposed to one side of the corresponding scanning line;
second pixel electrodes provided in correspondence with the scanning lines, each second pixel electrode being connected to the corresponding scanning line and being disposed on the other side of the corresponding scanning line than the corresponding first pixel electrode;
a first signal electrode disposed in between the first substrate and the electro-optical material at a position adjacent to the first pixel electrode and connected to the first data line; and
a second signal electrode disposed in between the first substrate and the electro-optical material at a position adjacent to the second pixel electrode and connected to the second data line, the second signal electrode including an interline electrode portion located in between a second pixel electrode connected to one scan line and a first pixel electrode connected to a different scan line adjacent to the one scan line.

2. The electro-optical apparatus according to claim 1, wherein the first signal electrode includes an interline electrode portion located in between a first pixel electrode connected to one scan line and a second pixel electrode connected to a different scan line adjacent to the one scan line.

3. The electro-optical apparatus according to claim 2, wherein each of the first pixel electrodes and the second pixel electrodes includes a base portion and electrode portions, the base portion extending in a direction substantially parallel with the corresponding scanning line and being connected to the scanning line, the electrode portions being interconnected by the base portion and extending in a direction away from the scanning line, the interline electrode portion of each of the first signal electrodes and the second signal electrodes extending substantially perpendicular to and being connected to the corresponding one of the first and second data lines, each of the first signal electrodes and the second signal electrodes further including electrode portions interconnected by the interline electrode portion and extending toward the scanning line.

4. The electro-optical apparatus according to claim 1, wherein each of the first pixel electrodes and the second pixel electrodes is connected to the corresponding scanning line with a two-terminal nonlinear device therebetween.

5. The electro-optical apparatus according to claim 4, wherein the nonlinear device includes a first metallic layer formed on the electrode forming surface, an insulating layer formed on the surface of the first metallic layer, a scanning-line-side second metallic layer formed on the surface of the insulating layer and electrically connected to the scanning line, and an electrode-side second metallic layer formed on the surface of the insulating layer and connected to the first pixel electrode or the second pixel electrode.

6. The electro-optical apparatus according to claim 1, wherein each of the first signal electrode and the second signal electrode is connected to the corresponding first data line or the corresponding second data line with a two-terminal nonlinear device therebetween.

7. An electronic device comprising the electro-optical apparatus set forth in claim 1.

8. An electro-optical apparatus comprising:
a first substrate;
a second substrate opposing the first substrate;
an electro-optical material disposed between the first substrate and the second substrate;
a plurality of scanning lines disposed in between the first substrate and the electro-optical material;
a first data line and a second data line disposed in between the first substrate and the electro-optical material and intersecting with the scanning lines;
a first transistors disposed at intersections between the first data line and the scanning lines;
first pixel electrodes provided in correspondence with the scanning lines, each first pixel electrode being connected to the corresponding first transistor;
second transistors disposed at intersections between the second data line and the scanning lines;
second pixel electrodes provided in correspondence with the scanning lines, each second pixel electrode being connected to the corresponding second transistor and being disposed on the other side of the corresponding scanning line than the corresponding first pixel electrode; and
a common electrode disposed in between the first substrate and the electro-optical material at a position adjacent to the first pixel electrode and the second pixel electrode, the common electrode including:
a first interline electrode portion located in between a first pixel electrode that is connected, via a first transistor, to one scan line and a second pixel electrode that is connected, via a second transistor, to a different scan line adjacent to the one scan line, and
a second interline electrode portion located in between a second pixel electrode that is connected, via a second transistor, to the one scan line and a first pixel electrode that is connected, via a second transistor, to a different scan line adjacent to the one scan line.

9. The electro-optical apparatus according to claim 8, wherein each of the first pixel electrode and the second pixel electrode includes a base portion extending substantially parallel with the corresponding scanning line and connected to the transistor and electrode portions interconnected by the base portion and extending away from the scanning line, and
the common electrode includes the interline electrode portion extending substantially parallel with the scanning line and electrode portions interconnected by the interline electrode portion.

* * * * *